E. D. CHAPLIN.
MANUFACTURE OF ACIDS.
APPLICATION FILED JAN. 27, 1916.
1,325,711.
Patented Dec. 23, 1919.
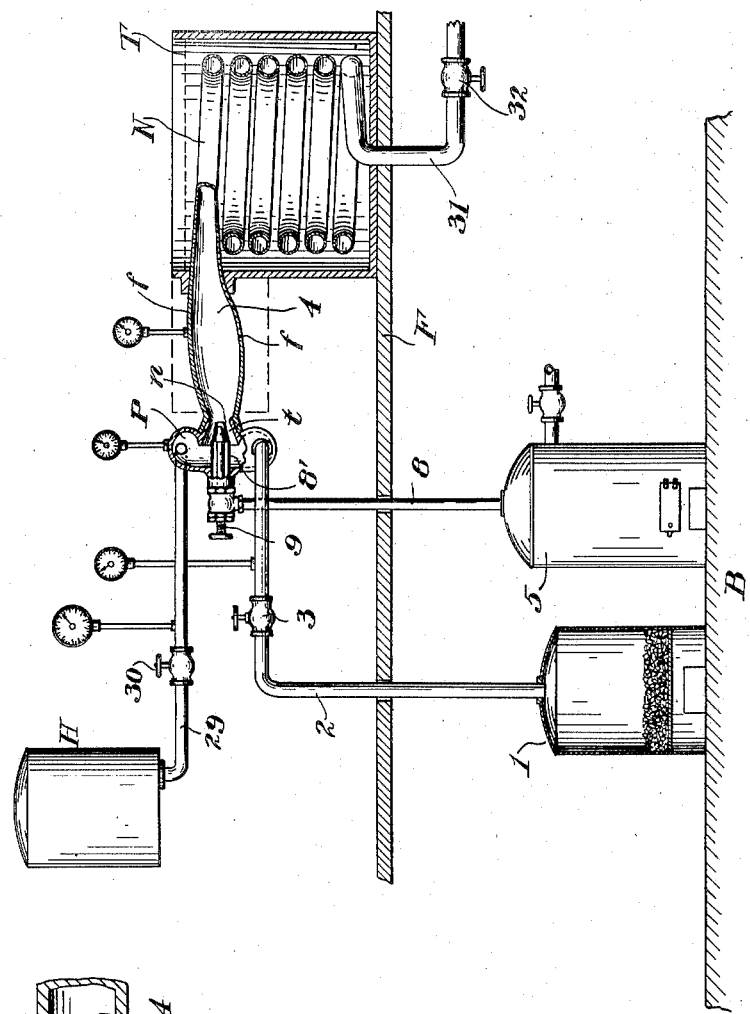
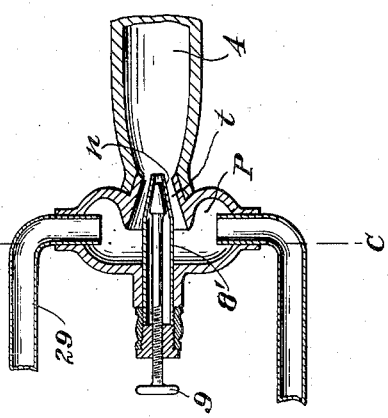
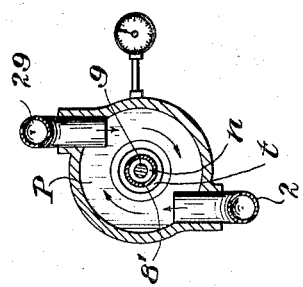
Inventor:
Edwin D. Chaplin,
By F. H. Richards,
his Att'y.

UNITED STATES PATENT OFFICE.

EDWIN D. CHAPLIN, OF NEW YORK, N. Y.

MANUFACTURE OF ACIDS.

1,325,711.  Specification of Letters Patent.  Patented Dec. 23, 1919.

Application filed January 27, 1916. Serial No. 74,530.

*To all whom it may concern:*

Be it known that I, EDWIN D. CHAPLIN, a citizen of the United States, residing in New York, in the county of New York and State of New York, have invented certain new and useful Improvements in the Manufacture of Acids, of which the following is a specification.

This invention relates more especially to the manufacture of sulfuric acid of the highly concentrated grades, a principal object being to furnish a commercially effective process for the direct manufacture of the full-strength acid in a continuous manner; also to furnish an improved process for the simultaneous manufacture of two non-similar acids of which one is or may be sulfuric acid of the concentrated kind or grade.

In carrying out my present process, I preferably employ a connected apparatus or plant comprising three ingredient-supplying component apparatuses, one for a continuous and regulable supply of a gas consisting entirely or chiefly of chlorin; another for a similar supply of a gas comprising sulfur-dioxid, and preferably rich in this ingredient; and, third, a suitable steam-supplying apparatus. In this plant, I prefer to employ, as said first apparatus thereof, an electrolytic chlorin producer, (not herein shown), since it is desirable to have the chlorin supply as free as practically possible from other substances; one suitable producer of this class is described in U. S. Letters Patent No. 695,033, dated March 11, 1902. For the second said apparatus I preferably employ some furnace or like device, or means, for producing direct from a sulfur-mineral, a "burner-gas" rich in sulfur dioxid. For the third said apparatus I employ a steam-generator, and this should, in practice, be adapted for producing a relatively "dry" steam, and be so located and connected as to deliver a continuous and regulated supply to the combining point, where the primary reactions and the acid-forming combinations, take place in a rapid manner, and initially produce a concentrated grade of the sulfuric-acid.

In the accompanying drawing, Figure 1, diagrammatically illustrates,—partly in vertical section,—a convenient arrangement of apparatus for carrying out my present improvements. Fig. 2 is a detail sectional view in line C, C, Fig. 3, and Fig. 3 is a fragmentary plan view, also partly in section of the combining-chamber and certain of the immediately connected details, as hereinafter more fully explained.

Similar characters designate like parts in all the views.

In the apparatus illustrated, a closed combining vessel, or chamber, 4, is conveniently located for connection with the sources of supply of the required acid-forming ingredients, and for the discharge of the products into some suitable receptacle therefor. The chamber 4 may be of a relatively tubular form, and together with the pipes leading thereto and therefrom, is or may be analogous in general arrangement with ejectors which are operated by a jet of steam. The improvements in the apparatus, however, will constitute in part the subject-matter of a separate application to be co-pending herewith.

The combining-chamber 4 is herein shown as being of a tubular form,—which is regarded as the preferable one,—and as being connected with, or continued directly into the extended cooling coil N, which may be located within a cooling tank T. This tank, when used, may be supplied by some suitable means (not shown), with a cooling fluid, usually water, in a well-known manner. The coil N may be continued into the pipe 31, having a valve 32, whereby the gases and liquids from the cooling apparatus, (as the coil N, or other cooling device in lieu thereof), may be conducted away and suitably disposed of. In practice, the products from the coil N will usually be conducted to a distillation apparatus for the separation,—in a well-known manner,—of any hydrochloric acid gas which may have been absorbed by the strong sulfuric acid.

For supplying the several ingredients or acid-forming materials, separate storage or producing means may be employed for each. When the sulfur dioxid is supplied from a "burner-gas", this gas may be conducted directly from a producer, at 1, through a pipe, 2, having a regulation valve, as 3. The steam may be supplied from any suitable boiler, as 5, through a pipe, 8, having a regulation valve, 9. And the chlorin may be drawn from a stored-up supply, or from a producing apparatus (not shown); such a supply means may be located remotely, as at H, and the chlorin be conducted through the pipe 29, and regulation valve 30, directly to the combining chamber of the apparatus, or "plant". Each of the pipes 2 and 29 may be provided with a regulable gas-propelling pump or like means, whenever deemed necessary, for passing through the pipes, measured quantities of the respective gases.

As an illustration of the manner in which the acid plant may be installed in a building, the said members 1 and 5 are shown in the drawing as if set upon a floor, as B, which in practice, is preferably a concrete floor in the lower story of a building which also has an upper floor or gallery, as F, upon which the chlorin-supply means at H, the tank T, and the combining-apparatus may be set or supported in a convenient arrangement for access and supervision of the attendants. The arrangement illustrated, permits all of the supply-regulating valves, as 3, 9 and 30, to be located in convenient positions above the floor F. The pipes 2 and 8 may, and should usually be inclosed with some non-conducting covering, to prevent undue loss of heat in the gases or vapors supplied through them.

The "combining" or reaction chamber 4 is herein shown provided with a relatively separate chamber P, which communicates with the chamber 4 through an annular space $t$ which surrounds a tubular conical nozzle, $n$, which is a terminal for the steam pipe 8. For regulating the supply of steam to the nozzle $n$, a valve, 9, is shown (see Fig. 3) with its point fitting the inside of the nozzle, the arrangement preferably being such as to provide for a releasing of the steam from a high-pressure directly into the reaction chamber 4, so that nearly all of the actual expansion of the steam may take place within this chamber.

The pipes for the chlorin supply, 29, and for the burner-gas supply, 21, are shown in the drawing as entering the mixing chamber P from opposite directions, and in a tangential arrangement, (Fig. 2), while the steam-supply pipe, 8, is indicated as entering said chamber at 8', on a line transversely to and between the forward end-portions of said pipes 2 and 29. Therefore, as will be evident, the steam issuing-forcibly from the nozzle $n$ of the pipe 8, into the vessel 4, will form an expanding jet-current normally acting to take up and intimately commingle with a jet of burner-gas and chlorin issuing through the space $t$. In practice, the relative locations where said pipes enter the combining vessel, or the mixing chamber P, may be varied in order to favor the effective mixing action.

For enabling the operator to more accurately maintain and regulate the supply of ingredients, each of the supply pipes is shown provided with a pressure gage (indicated in a conventional manner in the drawing), and the chambers P and 4 are also shown in Fig. 1, each furnished with such a gage, whereby to indicate the pressures within these chambers, and thus aid in properly adjusting the several supply-regulating valves.

When the burner-gas is made by heating or "burning" a suitable sulfur-carrier (as crude sulfur, pyrites, or other sulfur-bearing compound) in the presence of oxygen mixed with another gas,—as for instance, atmospheric air,—the burner-gas so produced is, of course, mixed with gases other than the required sulfur dioxid, and accordingly, in practice, the burner-gas should be supplied in a requisite proportion so that all the chlorin as well as all of the sulfur dioxid may be utilized, and to this end, a proper and continued regulation of the supply or admission of each of the three acid-forming ingredients is required for securing a maximum production of the acids in a highly concentrated form or quality. These acid-forming ingredients are brought together into an intimate commingling directly on their entrance into the combining vessel or space, so that in practice the burner gas is at once associated and mixed, and incorporated, with the heated and highly-expanded steam, while this mixture is further incorporated and combined with the chlorin which is thus introduced in a colder and less expanded condition but is immediately heated by the other gases and the excess heat of the reactions which thereupon take place. Thus, in my present process, the former slow and gradual absorption methods requiring large chambers and much time, are replaced by an intensive method initially producing the sulfuric acid in a full or nearly maximum strength not usually requiring a subsequent concentration by the removal of a part of a water component thereof. By reducing the steam supply to a proper amount, that is, to an amount less than required for the conversion of all the sulfur trioxid, ($SO_3$), to sulfuric acid, the remaining sulfur trioxid may be regarded as being dissolved in the acid already completely formed, and thus produce "Nordhausen" or the so called "fuming" grade of the acid, in which case all the hydrochloric acid will normally pass off as a gas.

The steam in issuing from the valve 9 forms a jet-current within the inclosed combining chamber-space 4, and on being thus instantly released from a high pressure, the steam at once assumes a rapidly-expanding state or condition and in some respects then has the nature of a gas. The incorporated acidic elements,—as the sulfur and chlorin,—on being incorporated with the inclosed jet-current, are thereby each subjected to the action of the other in the presence of expanding steam; preferably the steam should be "dry," as may be readily secured by a moderate degree of superheating, in a well-known manner. Similarly, on incorporating said materials, the said gaseous acidic elements are subjected to the described action during the period of disassociation of the water-forming elements, and during a period of steam expansion, which will also normally be a period of concurrent increase of temperature and diminishing pressure. Thus the two acid-forming gaseous elements, respectively, are directly combined with the hydrogen and oxygen, which, of course, are the two acid-forming elements of water, and are combinable one of them with sulfur, and another of them with chlorin, thereby simultaneously forming two non-similar acids, such, for instance as sulfuric acid and hydrochloric acid. The process, therefore, provides for combining acid-forming elements into concentrated sulfuric acid and simultaneously combining acid forming elements including hydrogen from water into hydrochloric acid, by subjecting the chlorin to the action of water in the form of dry or superheated steam, in combination with a compound gas containing sulfur-dioxid associated with another gaseous element, or diluent, preferably consisting chiefly of nitrogen, which is not condensable to a material extent during the process.

By the improved process herein described, two non-similar acids may be said to be directly and simultaneously manufactured. Sulfuric and hydrochloric acids may be regarded as instances of acids having the relation of non-similarity, since they have different acidic elements which are in some respects neutral, in that these elements have a slight if any affinity, and hence are normally non-combinable directly with each other. The acidic element of the sulfuric acid being sulfur, (preferably in the form SO$_2$), this takes up one element of the water, oxygen, while the acidic element, chlorin, of the hydrochloric acid takes up hydrogen from the water. And these combining actions are practically accomplished by incorporating together, (preferably an inclosed jet-current), the said acidic elements in gaseous form, and subjecting these mingled or incorporated gases to the action of,— and to incorporation with,—water in the form or state of expanding steam, and having or being raised to a temperature at which the two water-forming elements separate from each other under the affinities thereof for the said acidic elements, respectively, with which the said separated elements at once combine. These actions and reactions, of course, are accompanied by the temperature changes due to the specific heats of the substances involved, so that, in practice, during the reduction of pressure in the expanding steam, (this being usually and preferably superheated), the temperatures may be increasing by reason of such reactions; whereas otherwise, the expansion of the steam would normally decrease the temperature, and this even to the point of initial condensation. Thus the acid-forming changes in and of the materials, may proceed under a diminishing pressure and an increasing temperature and may continue during a period in which the water, H$_2$O, (of the steam) breaks up and disappears by the dissociation of its constituent elements.

By supplying in my present process, the sulfur in a gaseous form or condition,—as by making a preliminary combination thereof, as sulfur dioxid,—and by also supplying this gas in a mixture with a relatively neutral gas,—as for instance, nitrogen,— not normally or more than slightly condensable or combinable during the process, this neutral gas becomes a diluent of and for the incorporated gases and steam during the period of the dissociation and reactions, and during the period of changing temperatures resulting from the reactions. Under the described conditions, therefore, such a neutral gas also constitutes a non-combining carrier for the gaseous acids as these are formed, and is also subjected to a considerable expansion by any increase of temperature during the dissociation of the water-forming constituents, or by the heat in coaction with the affinities which the acid-forming elements have under the said conditions for said water-forming constituents.

Thus the "carrier" gas by the amount of its expansion tends by that much to replace the volume of steam lost by the combinations thereof, and later on, when the incorporated products within and making up the inclosed stream within the combining vessel 4, the same expanded carrier-gas passes onward through the cooling apparatus where it is gradually reduced by contraction to a much smaller volume. By its capacity for absorbing a portion of the heat developed by the reactions during the said period of dissociation, the amount of heat necessary to be transmitted through the walls, as $f$, of the vessel 4, is reduced, while the increase of volume of the contents of said vessel operates to accelerate the forward flow therein, and thereby extend the region of high-temperature over a greater length of the tubular combining chamber or vessel, while reducing the otherwise maximum temperature at any one point.

A further and evident effect of the diluent neutral gas, is to mingle with and thereby separate the molecules or atoms of the substances directly involved in the reactions, and thus reduce the intensity while increasing the time-interval thereof. By these means, and by using a sufficient proportionate quantity of the neutral diluent, the otherwise normal violence of the reactions may be so far modulated as to avoid any unduly destructive effects upon the apparatus either by excessive heat or otherwise, and thus permit the continuous and direct production of the high-strength acid in a plant of a relatively minimum extent and investment cost, and on a large scale with a relatively low cost for operating and maintenance.

In carrying out my process in a practically operative apparatus, I have discovered that in some way not as yet fully known, the water-element,—$H_2O$,—when itself supplied in the form and condition of a gas to the other gaseous ingredients in the inclosed combining-vessel, appears to accelerate and improve the process and the final reactions, with the result of securing in a relatively small and inexpensive acid-plant, a large production of sulfuric acid of an initially concentrated quality. While the initial and intermediate reactions occurring during the interaction of the ingredients upon each other in the process, are believed to be complex and as yet not fully ascertained, it appears that the ultimate reaction (as regards the acid-forming substances) is in accordance with an equation expressed as follows,—

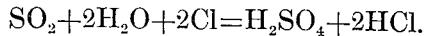

$$SO_2 + 2H_2O + 2Cl = H_2SO_4 + 2HCl.$$

This formula refers, of course, to the acids when each has a strength of 100%, and if more water be used, the acids, as is well-known, will be in solution therein. Also it appears that in some way not fully apprehended, the maintenance of the "water," ($H_2O$) in the described "gas-form" of actual steam during the combining period, or period of dissociation, of the steam, may operate to or suppress, or otherwise modify, some inimical chemical actions or effects as regards other materials which may be incidentally present as adulterants or by-products, but which are not directly required for the production of the sulfuric or hydrochloric acids.

From the foregoing description it will be evident that so long as the supply of chlorin, of sulfur dioxid and of steam, is continuously maintained in properly regulated proportions into the chamber 4, chemical reactions will take place therein, with the formation, initially, of a concentrated sulfuric acid accompanied by the formation of hydrochloric acid, these two acids being of a non-similar character.

Having thus described my invention, I claim:

1. The process of simultaneously forming concentrated sulfuric and hydrochloric acids which comprises mixing sulfur dioxid, chlorin, and an inert gas with steam, the mixture being effected while reducing the pressure to which the steam is subjected.

2. The process of simultaneously forming concentrated sulfuric acid and hydrochloric acids which comprises separately and simultaneously introducing sulfur di-oxid, chlorine, and an inert gas into a confining common mixing chamber, introducing steam into said chamber during the mixing of said sulfur di-oxid, chlorin and inert gas, and reducing the pressure to which the steam is subjected while said mixture is being effected.

3. The process of simultaneously forming concentrated sulfuric acid and hydrochloric acids which comprises separately and simultaneously introducing sulfur dioxid, chlorin and an inert gas into a confining common mixing chamber, introducing steam into said chamber during the mixing of said sulfur di-oxid, chlorin and inert gas, and reducing the pressure to which the steam is subjected while said mixture is being effected prior to the condensation of the steam.

4. The hereindescribed improvement in the art of combining one acid-forming element of water with an element to form one acid and simultaneously combining a second acid-forming element of water with an element to form another acid which consists in simultaneously subjecting two gases combinable respectively with said first and second elements of the water to the action of steam instantly upon a release thereof from a higher to a lower pressure.

5. The hereindescribed improvement in the art of combining one acid-forming element of water with an element to form one acid and simultaneously combining a second acid-forming element of water with an element to form another acid, which consists in simultaneously subjecting two gases combinable respectively with said first and second elements of the water to the action of super-heated steam by the incorporation thereof into an inclosed jet-current of expanding steam.

6. The hereindescribed improvement in the art of combining one acid-forming element of water with an element to form concentrated sulfuric acid and simultaneously combining a second acid-forming element of water with an element to form hydrochloric acid, which consists in simultaneously subjecting chlorin gas and a compound gas containing a neutral gas and sulfur dioxid to the action of steam by the incorporation thereof into an inclosed current of expanding steam prior to condensation occurring therein.

EDWIN D. CHAPLIN.

Witnesses:
GUSTAV DREWS,
H. D. PENNEY.